H. W. BÖTZ.
ELECTRODEPOSITION OF METAL ON ROTATION BODIES.
APPLICATION FILED JULY 14, 1913.

1,204,398.

Patented Nov. 14, 1916.
5 SHEETS—SHEET 1.

H. W. BÖTZ.
ELECTRODEPOSITION OF METAL ON ROTATION BODIES.
APPLICATION FILED JULY 14, 1913.

1,204,398.

Patented Nov. 14, 1916.
5 SHEETS—SHEET 2.

WITNESSES

INVENTOR

H. W. BÖTZ.
ELECTRODEPOSITION OF METAL ON ROTATION BODIES.
APPLICATION FILED JULY 14, 1913.

1,204,398.

Patented Nov. 14, 1916.
5 SHEETS—SHEET 5.

UNITED STATES PATENT OFFICE.

HEINRICH WILHELM BÖTZ, OF LUDWIGSHAFEN-ON-THE-RHINE, GERMANY.

ELECTRODEPOSITION OF METAL ON ROTATION-BODIES.

1,204,398. Specification of Letters Patent. Patented Nov. 14, 1916.

Application filed July 14, 1913. Serial No. 778,911.

*To all whom it may concern:*

Be it known that I, HEINRICH WILHELM BÖTZ, a citizen of the German Empire, and resident of Ludwigshafen-on-the-Rhine, Germany, have invented new and useful Improvements in the Electrodeposition of Metal on Rotation-Bodies, of which the following is a specification.

This invention relates to a process for electro-plating rotation bodies, and more particularly for zincing the fellies or rims of wheels, and to apparatus suitable for practising the process.

It has already been proposed to provide a felly which is to receive the tire in a bicycle, motor-car or the like with a coating of zinc instead of one of enamel or varnish. The usual process of galvanizing in a bath of molten metal has proved little suitable for the purpose in question, while good results have followed zincing by a true galvanic method. The electrolytic zincing can' alone come into consideration when it is not desired to zinc all parts of the felly. In practice it is only essential that the inner surfaces and the outer edges of the channel, in fact the parts with which the tire comes in contact, should be zinced. The remaining parts, particularly in so far as they do not lie upon the wooden felly, are advantageously enameled or varnished. Since the enamel or varnish does not adhere better to zinced metal than to that which is not zinced, it is desirable on this ground alone to zinc practically only the parts which come in contact with the tire.

The operation of electrolytically zincing the felly presents various difficulties owing to the peculiar form of the article to be zinced. For obtaining a uniform deposit it is known to be necessary that an anode of suitable form should be opposed to the felly which serves as the cathode so that at every part there shall be the same distance between the electrodes. This requirement is most exactly met by a rotation body the profile of which is equi-distant from that of the felly. Only those parts of this curved body come into question which are opposite the parts to be zinced, that is to say those parts which fill the hollow of the profile and extend on both sides outward somewhat over the lateral curved flanges of the felly. However, even with this limitation the profile of the anode remains such that the placing of the anode in position for use is not possible without some device for the purpose. The inner diameter of the annular anode is smaller than the external diameter of the felly so that it is necessary to cut through the ring transversely at one place at least. Moreover, the felly has curved flanges on both sides into which the grooves formed by the anode must extend; the anode is therefore broader than the gap between the curved flanges of the felly. To meet this condition by cutting up the anode by circumferential cuts and introducing the strips thus made into the felly would only be to create further difficulty in that the strips would have to be built up to a single ring again within the felly. These difficulties are overcome by the present invention by conducting the zincing operation in two stages, that is to say by first zincing one of the grooves and the limiting parts thereof and then zincing the other groove and parts. Finally, there is the trouble that the felly is not an exact rotation body but always presents certain deviations along various diameters. This objection is set aside by the present invention in that the anode is constructed to have a certain amount of flexibility, that is to say it is not rigid as it would have to be if it were a rotation body of the theoretically correct form.

The correct position of the anode must be insured by suitable pieces of insulating material. For this purpose there are used according to the invention plates of fiber, ebonite, celluloid or the like, which extend over half of the cross section of the interior of the profile of the felly and are provided each with a slot which allows of the plates being arranged in radial position at certain distances apart on the anode.

In the manner which has been set forth, a practicable anode may be made in two different forms at small cost.

The invention also includes a machine for rotating the felly relatively to the anode, as is necessary in order that the insulating plates which act as distance pieces between the felly and the anode may not be constantly situated in the same position, and thus prevent deposition of zinc on the parts of the felly which they cover.

The invention is illustrated in the accompanying drawings.

Figs. 7 to 13 illustrate a modification of the anode.

Figure 1:
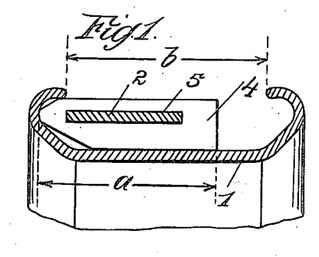
Figures 1 and 2 show in cross section and longitudinal section respectively a part of a felly having the anode in position.
Figure 2:
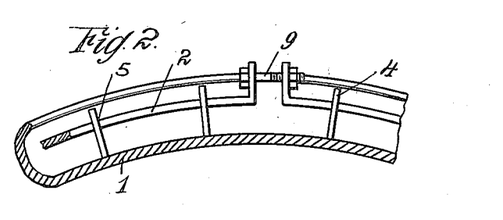
Figure 3:
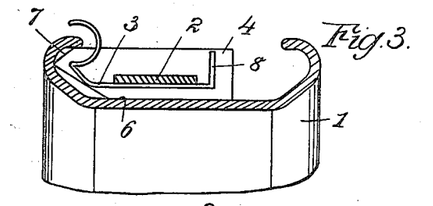
Fig. 3 is a cross section through a part of a felly having a modified form of the anode in position.
Figure 4:
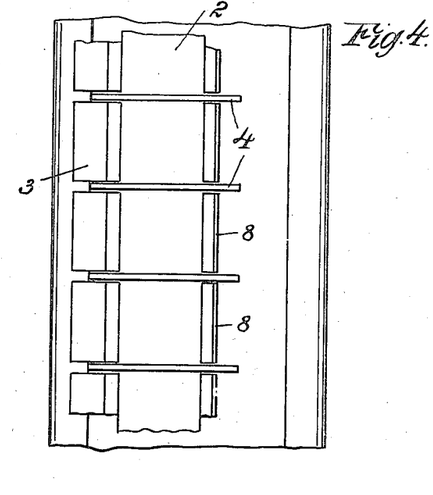
Fig. 4 is a developed plan of Fig. 3.
Figure 5:
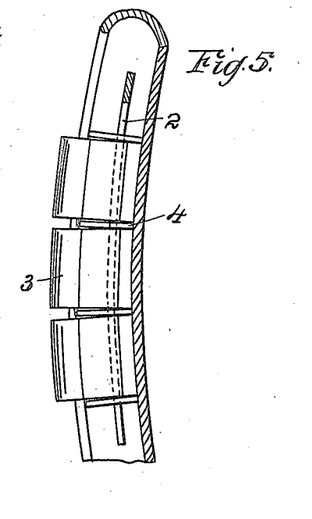
Fig. 5 is a longitudinal section through a part of the felly.
Figure 6:
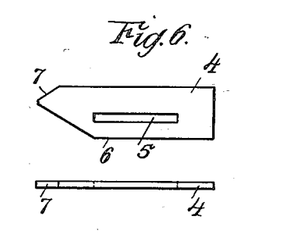
Fig. 6 shows in elevation and in plan one of the insulating plates.
Figure 7:
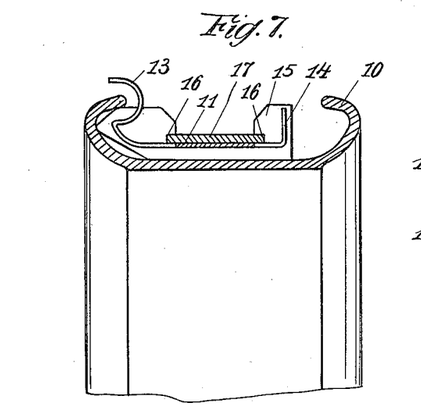
Fig. 7 is a cross section through a part of a felly having a second modified form of the anode in position.
Figure 8:
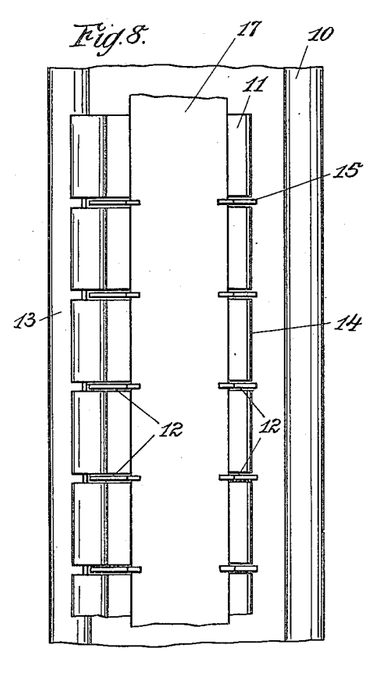
Fig. 8 is a developed plan of Fig. 7.
Figure 9:
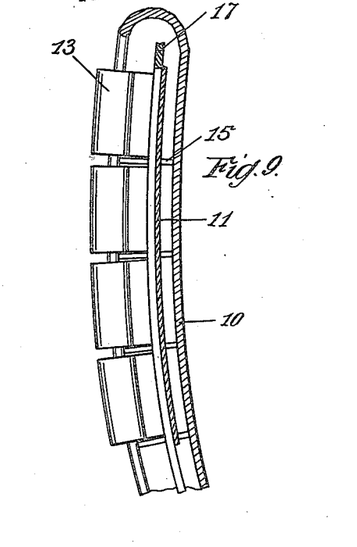
Fig. 9 is a longitudinal section through a part of the felly.
Figure 10:
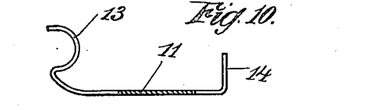
Fig. 10 is a cross section through the anode.
Figure 11:
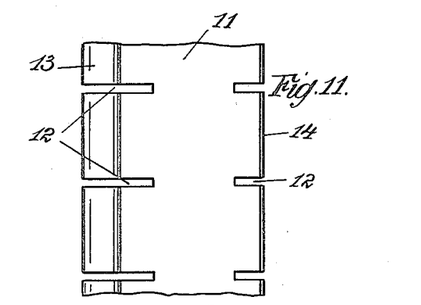
Fig. 11 is a plan of the anode before it is in position.

The form of anode shown in Figs. 1 and 2 is the simplest and will serve when it is not desired to zinc the outer surface of the curved flanges of the felly and when considerable difference in the thickness of the deposit in the channel of the felly, is permissible. In this case a zinc strip curved to correspond with the felly, and having radial insulating plates threaded on it suffices.

1 is the felly, 2 is the metal ring constituting the anode and 4 is one of the insulating plates provided with a slot 5.

It is essential that the length $a$ of the insulating plate should be smaller than the distance $b$ between the curved flanges of the felly. The anode 2 is, as already explained, cut through at one place, the two ends are bent outward and may be drawn together by means of a screw or clamp 9 after the anode has been brought into position (Fig. 2). An anode of this kind is very easily constructed but is not wholly free from objection. If a uniform zincing of the inner surface of the channel and also of the outer surface of the curved flanges is required, the aforesaid difficulties may be avoided by adopting the form about to be described with reference to Figs. 3–6. There is substituted for the rotation body a polygonal body, which, however, differs from the rotation body only to an inconsiderable degree because of its large number of angles. The short prismatic pieces 3 are made easily and accurately from flat sheet zinc by means of suitable bending devices. In order to unite them to form a connected whole, they are soldered side by side on a flat flexible zinc strip 2, upon which the insulating plates 4 provided with slits 5 are at the same time threaded in radial position as in the first described form. Thus between each two anode sections there is an insulating plate which completely insures a proper position of the anode. This action of the insulating plates is supported by an upwardly bent flange 8 of the anode section, which is unimportant so far as the actual zincing is concerned. The insulating plates have a straight side 6 and a nose 7. The first rests against the bottom of the channel of the felly 1 while the latter engages in the groove formed by the curved flange of the felly.

In the form just described, the several sections of the anode are soldered to a zinc strip. In the modification described with reference to Figs. 7 to 13 the anode is made from a single zinc strip by slitting the strip at suitable places and bending the edge to the form desired of the finished anode. This necessitates provision for mounting the insulating plates on the finished anode which would be impossible if the plates were constructed, in the manner already described, with a closed slot. Instead of this the plates are recessed on one side so that they can be pushed over the anode ring in a radial direction at the places where the slits are situated, that is to say where there is a space between two of the curved pieces of the ring. The insulating plates are held firmly on the ring by means of suitable key pieces for which purpose they are provided with notches within the recess in which the edges of a strip can engage to serve as a key.

Figure 12:
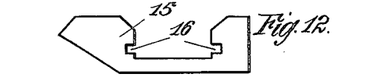
Figs. 12 and 13 are an elevation and plan respectively of one of the insulating plates.
Figure 13:
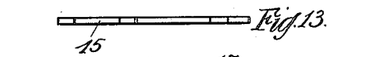
Figure 14:
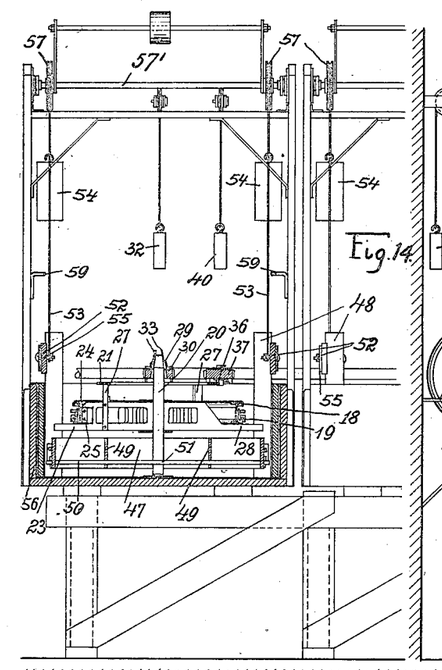
Fig. 14 is a vertical section through the machine constructed according to this invention.

Referring to Figs. 7 to 13, 10 is the felly and 11 the annular anode. The latter is made in one piece, the flat strip being provided with slits 12 on each of its edges at right angles thereto and in line with each other. The edges are then bent into the form shown at 13 and 14. The insulating plates 15 are recessed on one side, as shown in Figs. 12 and 13, and the recess is notched as at 16. When the insulating plates have been placed on the anode ring 11 by inserting them in the slits 12, a strip 17 is caused to engage in the notches 16 so as to fix the plates in position.

A separate key might be used for each plate, but it is advantageous to use a key common to a large number of the plates.

Whichever form of key is adopted it may be of insulating material (fiber or celluloid) or of zinc or other metal of which the anode may be constructed.

Figure 15:
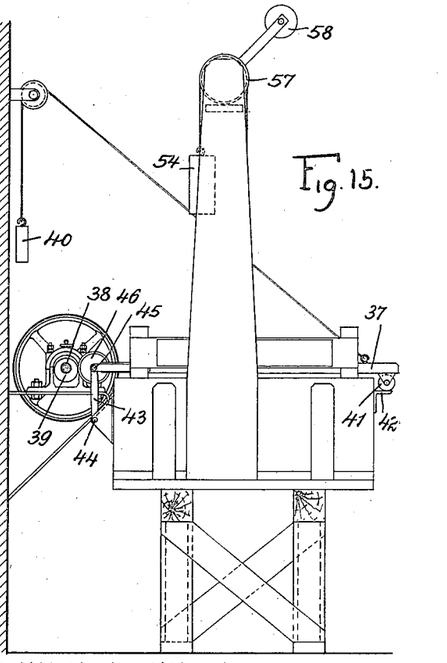
Fig. 15 is a side elevation thereof.
Figure 16:
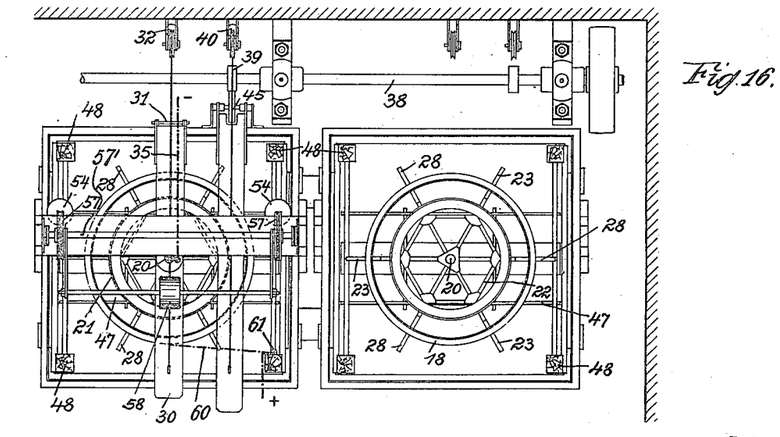
Fig. 16 is a plan showing two of the machines side by side.
Figure 17:
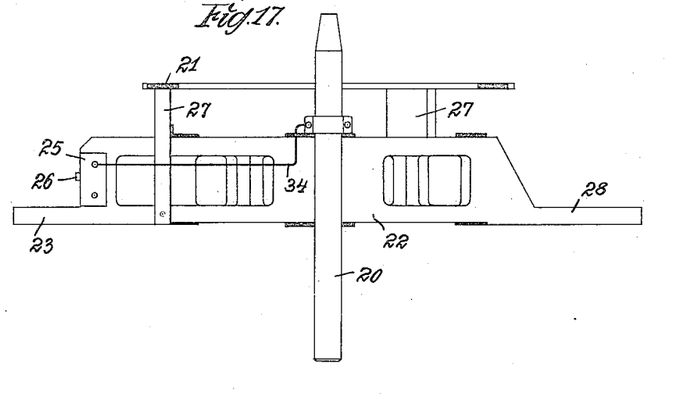
Fig. 17 is an elevation drawn to an enlarged scale of a star wheel for rotating the felly.
Figure 18:
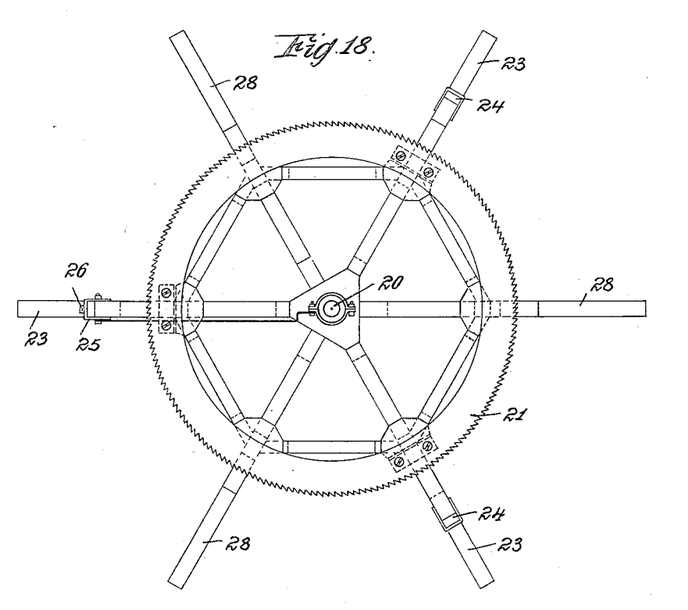
Fig. 18 is a plan thereof.

Proceeding now to describe the machine illustrated in Figs. 14–20, 18 is the felly, 19 the anode resting therein, 20 the axle around which the felly turns. 21 is the ratchet wheel and 22 a star wheel having six arms and made of wood or like insulating material. This star wheel serves to connect the felly on the one hand with the axle 20 and on the other hand with the ratchet wheel 21, as shown in Figs. 17 and 18. Three of the arms 23 of this star wheel 22 are constructed in a particular manner as indicated in Fig. 17 on the left hand side thereof; they are exchangeable and are made to suit the inner diameter of the felly under treatment. The felly is fixed to the star wheel by means of keys 24 which are inserted downward between the felly and the oblique faces of two of the arms 23. The third arm 23 has on its face a brass plate 25 which is connected electrically with the axle 20. This brass plate is advantageously provided with a short pin 26 which engages in the valve hole of the felly so that the latter is with certainty rotated together with the star wheel. Embracing each of the three arms is a wooden fork 27 screwed to the arm; on the upper surface of these three wooden forks is screwed a ratchet wheel 21 which is constructed as a ring to avoid unnecessary weight. Besides these three exchangeable main arms which serve to connect the felly with the ratchet wheel there are three auxiliary arms 28 which can not be exchanged; these arms complete the star and like the main arms they have at the lower part of their outer ends beak-like extensions which serve as supports on which the anode is laid when the felly is inverted or exchanged for another. The auxiliary arms 28 are made to fit the smallest felly which can be treated in the apparatus.

The exchange of the felly is much facilitated if the star wheel with the felly can be raised above the level of the liquid in the bath. In any case there must be free space above the felly for effecting the exchange. In particular the upper bearing or the pawl with its carrier must not be in the way. With this end in view the upper bearing 29 of the axle 20 consisting of a metal plate is fixed to a wooden arm 30, which can be raised by turning it on a pin 31 mounted at the rear side of the bath and is balanced in its raised position by a counter-weight 32. The rope for this purpose extends obliquely rearward and upward so that the arm in its lower position has the greater weight. For conducting the current the arm 30 has contact springs 33 which are soldered or screwed to the bearing plate and in the lower position of the arm make contact with the upper part of the axle, which for its part is connected electrically with the brass plate of the third main arm 23 by the lead 34. The bearing plate 30 carrying the contact springs is connected with the negative pole of the source of current through a flexible rope 35, which from the point of connection outward extends along the length of the arm.

From what has been said it will be seen that the axle must extend through the bearing plate. In order that the bearing arm notwithstanding this may be turned down over the end of the axle, the latter is coned upward and the bearing arm has a downwardly coned bore. In Fig. 15 the bearing arm has been omitted to make the figure more clear.

As soon as the bearing arm has been turned up the star wheel 21 can be raised, provided that the pawl 36 has been previously taken out of the way. To render this possible the pawl is arranged as follows: It is under action of a spring and can turn about a vertical axis on the underside of a second wooden arm 37 which is pushed by an eccentric 39 mounted on a shaft 38 extending along the rear side of the bath and is returned to its original position by the action of a weight. At its forward end this arm 37 carries on its underside a roller 41, supported on a bracket 42, fixed to the bath. At its rear end the arm 37 is carried by a vertical link 43 which can oscillate about a horizontal axle 44 fixed to the casing of the bath. The upper axle 45 which connects the wooden frame 37 with the link 43 carries in a slot in the link a freely mounted roller 46 which receives the pressure of the eccentric 39. The arm can be turned up around the axle 45 like the bearing arm 30. Also like the latter it is provided with a counter-weight 40 connected with it by a cord extending obliquely upward and rearward. When the two arms have been turned up, the star wheel with the felly and the anode can be raised from the bath. In order to facilitate this and in order to fix the star wheel in its upper position, so that one can operate on the felly undisturbed, the following arrangement is also desirable: Beneath the star wheel in the bath there is a wooden frame 47 which during the galvanizing serves as the lower bearing for the axle 20, but in its highest position becomes a carrying frame for the star wheel 22.

Figure 19:
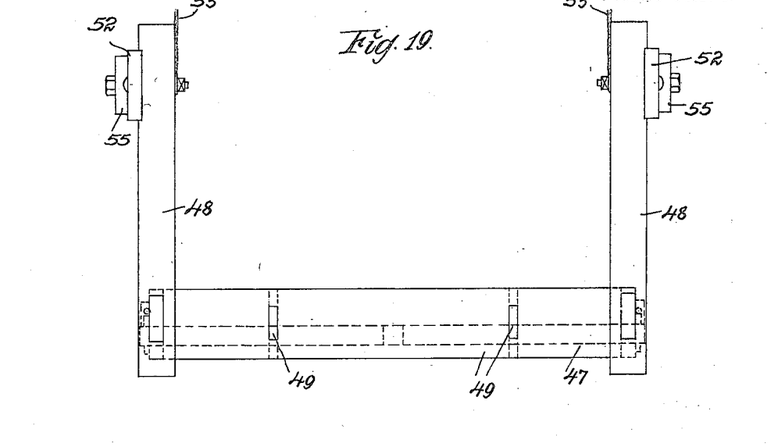
Figs. 19 and 20 are an elevation and plan respectively drawn to an enlarged scale of a frame for carrying the said star wheel.
Figure 20:
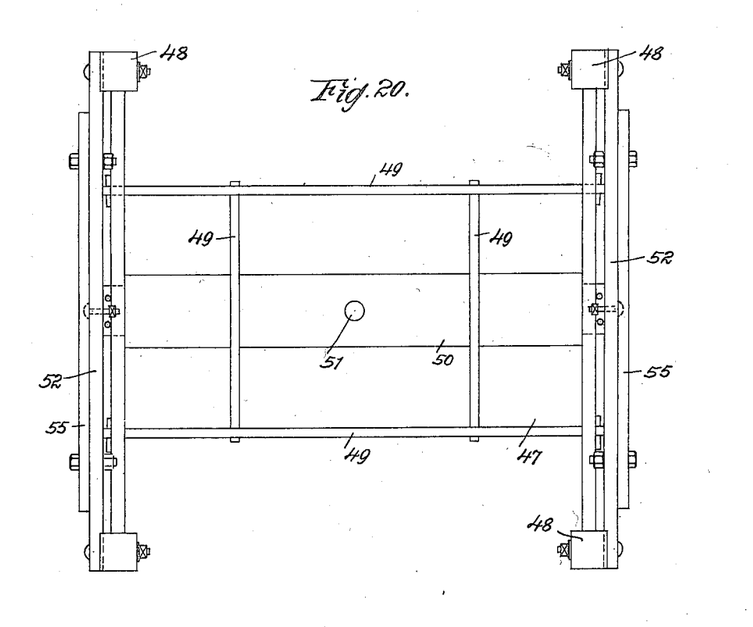

Referring to Figs. 19 and 20, the carrying frame comprises four posts 48 within which are four rails 49 standing on edge and constituting a rectangular frame which forms a bed for the star wheel. This frame is transversed by a rail 50 lying flat which in the middle carries a stepped bearing 51 for the axle of the star wheel. At their upper part the posts are connected together in pairs by two cross rails 52 to which are attached the two ropes 53 having counter-weights, 54. The cross rails also carry two weights 55 of iron or lead which keep the frame on the bottom of the bath during the galvanizing process. The posts 48 of the frame 47 are guided at the angles of the bath 56 with little play, the bath 56 being protected by lead and coated with wood. In order that the frame may rise and descend evenly the ropes to which the counter-weights are attached extend over two rollers 57 connected rigidly together by their common axle 57' and each firmly clamped at one place on its periphery. When now the carrying frame with the star wheel and the anode is resting in the bath it is buoyed up considerably, which obviously does not happen when it is in its raised position. In both positions, however, the movable parts must be secured. For this purpose on rollers 57 are fixed two arms to which a weight 58 is attached. This weight acts in the lower position of the frame against the counter-weights 54 which will in that position be too heavy and supports the counter-weights in the elevated position of the frame so that they are deposited firmly on two stop brackets 59. The rectangular carrying frame is only constructed of such a height and the star wheel fixed on its axle at such a height that between the star wheel and the frame when the latter is in its lowest position there is sufficient play to permit of free rotation of the star wheel with certainty.

The current is conducted to the anode through a suitably insulated lead soldered to it as seen in Fig. 16 at 60. The lead serves also for holding the anode stationary, preferably being fixed for this purpose at 61 on the front post 48 of the frame.

The machine hereinbefore described renders possible even when a large number of simultaneously operated galvanizing baths are collected together in one installation to invert the felly in each separate bath without difficulty and to transfer the anode from one groove of the channel into the other groove; also, after the whole operation is complete, to exchange the felly for another. The baths are inserted in the circuit in series and when the operation of one is completed that one can be separately short circuited.

Having thus described my invention and the best means I know of carrying the same into practical effect I claim:—

1. The process of electrolytically depositing metal on the surface of wheel fellies which come in contact with the tire which consists in first electro-plating the surface over approximately half of its width and then electro-plating the remaining portion of the surface, for the purpose described.

2. Process for electrolytically depositing metal on wheel fellies having inwardly curved flanges, which process consists in first subjecting the groove formed by one curved flange to the electro-depositing process and then subjecting the groove formed by the other curved flange to the electro-depositing process.

3. The process of electrolytically depositing metal on wheel fellies having curved flanges which consists in first electro-plating the inner surface of one curved flange and the portion of the outer surface of such flange which comes in contact with the tire of the wheel and then electro-plating the inner surface of the other curved flange and the portion of the outer surface of such flange which comes in contact with the tire of the wheel.

4. An anode for use in electrolytically depositing metal on wheel fellies having inwardly curved flanges or like hollow bodies, comprising an annular metal strip adapted to lie in the channel formed by the inwardly curved flanges and insulating plates carried by the said strip and adapted to act as distance pieces between the said strip and the inner surface of the said channel.

5. An anode for electrolytically depositing metal on wheel fellies having inwardly curved flanges or other like hollow bodies, comprising an annular strip of metal, having laterally extended portions associated therewith of such form that their surfaces are substantially parallel with those on which metal is to be deposited, and distance pieces of insulating material carried by the said strip.

6. An anode for electrolytically depositing metal on a wheel felly having inwardly curved flanges or like hollow bodies, comprising an annular metal strip, having a series of laterally extended portions of such form that their surfaces are substantially parallel with those on which metal is to be deposited, insulating distance pieces carried by said metal strip and flanges on the said laterally extended portions adapted to support the said insulating pieces.

7. An anode for electrolytically depositing metal on wheel fellies having inwardly curved flanges or like hollow bodies comprising an annular metal strip, slits in each edge of the said strip at right angles thereto and in line with each other, the portions between the slits on one edge of the strip being curved so that when the anode is in place the surface of this side of the strip may be substantially parallel to the surface on which metal is to be deposited, the part between the slits on the other edge of the strip being turned to form flanges, and insulating distance pieces carried by the said strip in a number of the said slits.

8. An anode for electrolytically depositing metal on wheel fellies having inwardly curved flanges or like hollow bodies comprising an annular metal strip, slits in each edge of the said strip at right angles thereto and in line with each other, the portions between the slits on one edge of the strip being curved so that when the anode is in place the surface of this side of the strip may be substantially parallel to the surface on which metal is to be deposited, the part between the slits on the other edge of the strip being turned to form flanges and distance pieces of insulating material recessed so that they can be pushed over the said strip in the said slits.

9. An anode for electrolytically depositing metal on wheel fellies having inwardly curved flanges or like hollow bodies comprising an annular metal strip, slits in each edge of the said strip at right angles thereto and in line with each other, the portions between the slits on one edge of the strip being curved so that when the anode is in place the surface of this side of the strip may be substantially parallel to the surface on which metal is to be deposited, the parts between the slits on the other edge of the strip being turned to form flanges, distance pieces of insulating material recessed so that they can be pushed over the said strip in the said slits, notches in the said recesses and a locking device adapted to engage in the said notches to fix the said distance pieces in position.

10. In apparatus for electrolytically depositing metal on a rotation body, an anode having an annular surface substantially parallel throughout to the surface of the body to be treated, insulating distance pieces carried by the anode and engaging the rotation body to maintain the anode at the proper distance from the surface of the rotation body and means for mechanically rotating the said rotation body relatively to the said anode.

11. In combination, an anode for depositing metal on a wheel felly having inwardly curved flanges, the said anode consisting of an annular metal strip, surfaces on the said strip substantially parallel to the surfaces on which metal is to be deposited, distance pieces of insulating material carried by the said strip and means for mechanically rotating the said felly relatively to the said anode.

12. In combination, an electrolytic depositing bath, means for supporting and rotating a wheel felly horizontally in the said bath, an annular anode co-axially arranged around the said felly, distance pieces of insulating material carried by the said anode and means for rotating the said felly relatively to the said anode.

13. In combination, an electrolytic bath, means for supporting and rotating a wheel felly horizontally in the said bath, a star wheel supporting the said felly and also adapted to turn about the vertical axis, an annular anode arranged co-axially with the said felly, insulating distance pieces carried by the said anode and means for rotating the said star wheel and felly relatively to the said anode.

14. In combination, an electrolytic bath, a star wheel adapted to turn about a vertical axis in the said bath, and adapted to carry a wheel felly so as to turn therewith, an annular anode arranged coaxially with the said felly, insulating distance pieces carried by the said anode, a ratchet wheel fixed to the said star wheel, an oscillating pawl adapted to drive the said ratchet wheel and means for holding stationary the said anode.

15. In combination, an electrolytic bath, a frame resting in the said bath and adapted to be raised therefrom and lowered thereinto, a vertical axle mounted to turn in the said frame, a star wheel fixed to the said axle, and adapted to carry a wheel felly so as to turn therewith, an annular anode arranged co-axially with the said felly, insulated distance pieces carried by the said anode and means for rotating the said star wheel and felly relatively to the said anode.

16. In combination, an electrolytic bath, a frame resting in the said bath and adapted to be raised therefrom and lowered thereinto, a vertical axle mounted to turn in the said frame at its lower end, an arm hinged to the said bath so as to turn in a vertical plane, a bearing for the upper end of the said axle carried by the said arm, a star wheel fixed to the said axle, adapted to carry a wheel felly, an annular anode arranged co-axially with the said felly, insulating distance pieces carried by the said anode and means for rotating said star wheel and felly relatively to the said anode.

17. In combination, an electrolytic bath, a frame resting in the said bath and adapted to be raised therefrom and lowered thereinto, counter-weights attached to the said frame, an axle journaled at its lower end in the said frame, an arm hinged to the said bath so as to turn in a vertical plane, a bearing for the upper end of the said axle carried by the said arm, a star wheel fixed to the said axle, adapted to carry a wheel felly, an annular anode arranged co-axially to the said felly, insulating distance pieces carried by the said anode, a ratchet wheel fixed to the said star wheel, an arm hinged to the said bath and adapted to turn in a vertical plane, a pawl carried by the said arm and adapted to engage the said ratchet wheel so as to drive it, means for oscillating the said arm carrying the pawl so as to drive the ratchet wheel and means when the said frame is raised for counteracting the excess weight as compared with the weight when the frame is in the bath.

In testimony, that I claim the foregoing as my invention, I have signed my name in presence of two witnesses, this first day of July 1913.

HEINRICH WILHELM BÖTZ.

Witnesses:
JOSEPH PFEIFFER,
GEORG SCHAMBACH.